(12) United States Patent
Bonin et al.

(10) Patent No.: US 10,175,040 B2
(45) Date of Patent: Jan. 8, 2019

(54) CHARACTERIZATION OF REFRACTORY LINING OF METALLURGICAL VESSELS USING AUTONOMOUS SCANNERS

(71) Applicant: Process Metrix, LLC, Pleasanton, CA (US)

(72) Inventors: Michel Pierre Bonin, Danville, CA (US); Jared Hubert Hoog, Fairfield, CA (US)

(73) Assignee: PROCESS METRIX, Pleasanton, CA (US)

( * ) Notice: Subject to any disclaimer, the term of this patent is extended or adjusted under 35 U.S.C. 154(b) by 484 days.

(21) Appl. No.: 14/663,726

(22) Filed: Mar. 20, 2015

(65) Prior Publication Data

US 2016/0273907 A1    Sep. 22, 2016

(51) Int. Cl.
  *G01B 11/06*   (2006.01)
  *F27D 21/00*   (2006.01)
  (Continued)

(52) U.S. Cl.
  CPC ...... *G01B 11/0616* (2013.01); *F27D 21/0021* (2013.01); *G01B 11/026* (2013.01); *G01B 11/30* (2013.01); *G01S 7/4808* (2013.01); *G01S 17/10* (2013.01); *G01S 17/42* (2013.01); *G01S 17/48* (2013.01); *G01S 17/88* (2013.01); *G01S 17/89* (2013.01); *Y10S 901/01* (2013.01)

(58) Field of Classification Search
  CPC . C21C 5/4673; F27D 21/0021; G01B 11/026; G01B 11/24; G01S 17/89; G01S 7/4802; G01S 7/487
  See application file for complete search history.

(56) References Cited

U.S. PATENT DOCUMENTS 5,212,738 A * 5/1993 Chande ............... C21C 5/441
                                                   348/135
5,546,176 A * 8/1996 Jokinen ............... C21C 5/441
                                                   356/139.03
(Continued)

OTHER PUBLICATIONS

ISA/US, International Search Report and Written Opinion, International Patent Application No. PCT/US2016/018388, dated Apr. 25, 2016.
(Continued)

*Primary Examiner* — Luke D Ratcliffe
(74) *Attorney, Agent, or Firm* — Thomas Cinton; Donald M. Satina

(57) ABSTRACT

Apparatuses, methods, and systems are disclosed for autonomously characterizing the refractory lining in a container using an scanner that includes a scanning laser range finding system, a control system being communicatively connected to the laser scanning system to control the scanner; and a robotic vehicle having a controller communicatively connected to the control system and a drive system to propel the scanner autonomously in an area adjacent to the container, wherein characterization of the refractory lining is performed by comparing refractory thickness values determined from the distances measured from the laser scanning system to the surface of the refractory lining and the relative position of the scanner and the container, and comparing the same to a reference measurement of the refractory lining.

20 Claims, 6 Drawing Sheets

(51) Int. Cl.
*G01B 11/30* (2006.01)
*G01S 17/89* (2006.01)
*G01B 11/02* (2006.01)
*G01S 17/10* (2006.01)
*G01S 17/42* (2006.01)
*G01S 17/48* (2006.01)
*G01S 17/88* (2006.01)
*G01S 7/48* (2006.01)

(56) References Cited

U.S. PATENT DOCUMENTS

| | | | |
|---|---|---|---|
| 5,570,185 A | 10/1996 | Jokinen et al. | |
| 6,922,251 B1* | 7/2005 | Kirchhoff | C21C 5/44 356/601 |
| 6,922,252 B2* | 7/2005 | Harvill | G01B 11/00 356/614 |
| 7,069,124 B1 | 6/2006 | Whittaker | |
| 7,539,557 B2 | 5/2009 | Yamauchi | |
| 7,924,438 B2 | 4/2011 | Kleinloh et al. | |
| 8,577,538 B2 | 11/2013 | Lenser et al. | |
| 8,583,313 B2 | 11/2013 | Mian | |
| 2010/0106356 A1* | 4/2010 | Trepagnier | G01S 17/023 701/25 |
| 2010/0158361 A1* | 6/2010 | Grafinger | C21C 5/441 382/165 |
| 2011/0071718 A1 | 3/2011 | Norris | |
| 2012/0185115 A1* | 7/2012 | Dean | F41H 7/005 701/2 |
| 2013/0120738 A1 | 5/2013 | Bonin | |

OTHER PUBLICATIONS

Ferrotron/Minteq, "Scantrol system—A complete solution for complex problems," Sep. 2009.

Gerling et al., "Automatic EAF refractory maintenance," Millennium Steel, 2005.

Lankford et al., eds., The Making, Shaping and Treating of Steel, 10th ed., Chapter 18: Electric-Furnace Steelmaking, Section 3: Mechanical Features of Three-Phase Direct-Arc Electric-Furnaces and Auxiliary Equipment, United States Steel (USS), 1985.

* cited by examiner

CHARACTERIZATION OF REFRACTORY LINING OF METALLURGICAL VESSELS USING AUTONOMOUS SCANNERS

BACKGROUND

Technical Field

Embodiments of the subject matter disclosed herein relate generally to apparatuses, methods and systems and, more particularly, to devices, processes, mechanisms and techniques for the characterization of refractory lining of metallurgical vessels by autonomous scanners.

Description of Related Art

Measurement of the interior profile of vessels used in the production of molten metal using high-speed scanning laser range finders is widely used in the metal producing industry. Iron and steel ladles, Basic Oxygen Furnaces (BOFs), Argon-Oxygen Decarburization Vessels (AODs), Electric Arc Furnaces (EAFs), aluminum and copper smelting vessels, foundry furnaces, torpedo cars and bottom blown furnaces (Q-BOP's) are all analyzed using laser scanners to determine the interior refractory profile and calculate remaining lining thickness. In many operations, scanner operators are exposed to harsh environment in order to perform these desired measurements. In other areas of technology, such as military operations, autonomous mobile robots have been used to perform dangerous task, such as ordinance or explosives handling or disposal, field reconnaissance, terrain mapping, and various other procedures. Nevertheless, up to now, autonomous scanners have not been used in the metallurgical industry.

On a worldwide basis, few if any steel producing facilities operate their BOFs and AODs without laser scanner technology to determine the inner refractory profile. In Asia and the Americas, where vessel lifetimes can be upwards of 50,000 heats, laser scans are carried out up to 7 or 8 times in a 24-hour period. In Europe, refractory repair is less common and the furnace is operated to its minimum allowable refractory thickness and then replaced. Typical lining lifetimes are on the order of 3000 heats, and the laser scanner is not used until late in the lifetime of the lining. When the scanner is employed, the measurement data are used primarily to assess the maximum permissible lifetime while maintaining a low probability of breakthrough. In all cases, profile information is used to determine both the remaining lining thickness and the proper set point for the oxygen lance height; the latter determined by volume integration over the measured interior refractory profile. Two primary scanner configurations are currently in use—a mobile scanner and a fixed-position scanner.

A fixed-position scanner is normally mounted in a specific location in the steel mill so as to effect the necessary field of view into the vessel. With the exception of ladle and torpedo car measurement, the fixed-position system is dedicated to the vessel to be measured. Though there remains a cost consequence for this configuration, the system is readily available for measurement using a computer control station typically mounted in the plant control room.

Mobile scanners are typically applied to stationary vessels such as BOFs and AODs. They offer the cost advantage of multiplexing a single system to multiple vessels. BOF, Q-BOP and AOD furnaces are also plagued by skull accumulation in the furnace mouth that limits the field of view into the furnace. By measuring the furnace at various combinations of furnace tilt and mobile system position in front of the furnace, acceptable field of view into the furnace can be maintained and the majority of the interior profile measured.

Measurements are made with a mobile system by the operator first positioning the unit at the approximate first measurement position in front of the furnace—normally the furnace centerline. To avoid excessive thermal shock and spelling of the refractory, the furnaces are typically measured at or near operating temperatures, which can be as high as 1700° C. Under these conditions, heat shields are needed to protect the operator from the intense heat load that results when standing 2 to 3 meters from the vessel's mouth.

With the mobile laser system placed in position by the system's operator, the vessel is tilted to the proper angle to create the required view of the upper section of furnace interior and a scan of the vessel is made from this position. Once the scan is completed, the vessel is tilted to a second orientation to expose the lower section of the furnace interior. A scan is again made and combined with the prior scan. Next, the furnace is tilted to the horizontal position, and the mobile system is moved by the operator to the right of the furnace centerline, in preparation for measuring the left inner section of the furnace. Finally, the mobile system is moved to the left of the furnace centerline, and a fourth scan completed to document the right inner section of the furnace. All scans are then combined to create a data set that comprises the entire (or nearly the entirety) of the furnace interior. As noted, conventional mobile scanners require significant operator physical interventions before, during, and after measurements, thus exposing them to harsh and dangerous environments unnecessarily.

The mobile system offers cost advantages, as well as the flexibility of position that is often needed in the presence of significant furnace mount skull. However, the mobile configuration suffers in both measurement speed and operator safety; the latter being of primary importance in most steel mills. The heat load experienced while measuring a hot vessel is high; human tolerance of the environment this close to the furnace is on the order of seconds. Moreover, debris that collects in the hood region above the furnace can break away and fall into the measurement area. As some of this falling detritus can weigh several pounds or more, there is a real potential for significant bodily injury.

Therefore, based at least on the above-noted challenges and in order to improve safety, reliability and operability of a mobile scanning system, it would be desirable to have apparatuses, processes, and systems that use an autonomous mobile scanner that will eliminate, or substantially reduce, the requirement that the operator stand in the heat load to operate and move the mobile system.

SUMMARY

One or more of the above-summarized needs or others known in the art are addressed by apparatuses, methods, and processes to characterize autonomously the refractory lining in a container. Disclosed apparatuses include a laser scanning system to measure distances from the laser scanning system to a plurality of points on a surface of the refractory lining; a robotic vehicle attached to the laser scanner system having a controller and a drive system to propel the scanner autonomously from a first position to a second position; and a control system comprising hardware and software to control the scanner, said control system being communicatively connected to said laser scanning system, said controller, and said drive system, wherein the refractory lining is characterized by comparing the plurality of distances measured by the laser scanning system to a reference surface of the refractory lining.

Methods and processes for characterizing a refractory lining in a container are also within the scope of the subject matter disclosed herein. Such methods include the steps of propelling a laser scanning system autonomously from a first position to a second position by use of a robotic vehicle having a controller and a drive system; measuring with the laser scanning system distances from the laser scanning system to a plurality of points on a surface of the refractory lining; controlling the scanner by use of a control system comprising hardware and software, said control system being communicatively connected to said laser scanning system, said controller, and said drive system; and characterizing the refractory lining by comparing the plurality of distances measured by the laser scanning system to a reference surface of the refractory lining.

BRIEF DESCRIPTION OF THE DRAWINGS

The accompanying drawings (not drawn to scale), which are incorporated in and constitute a part of the specification, illustrate one or more embodiments and, together with the description, explain these embodiments. In the drawings.

DETAILED DESCRIPTION

Figure 1:
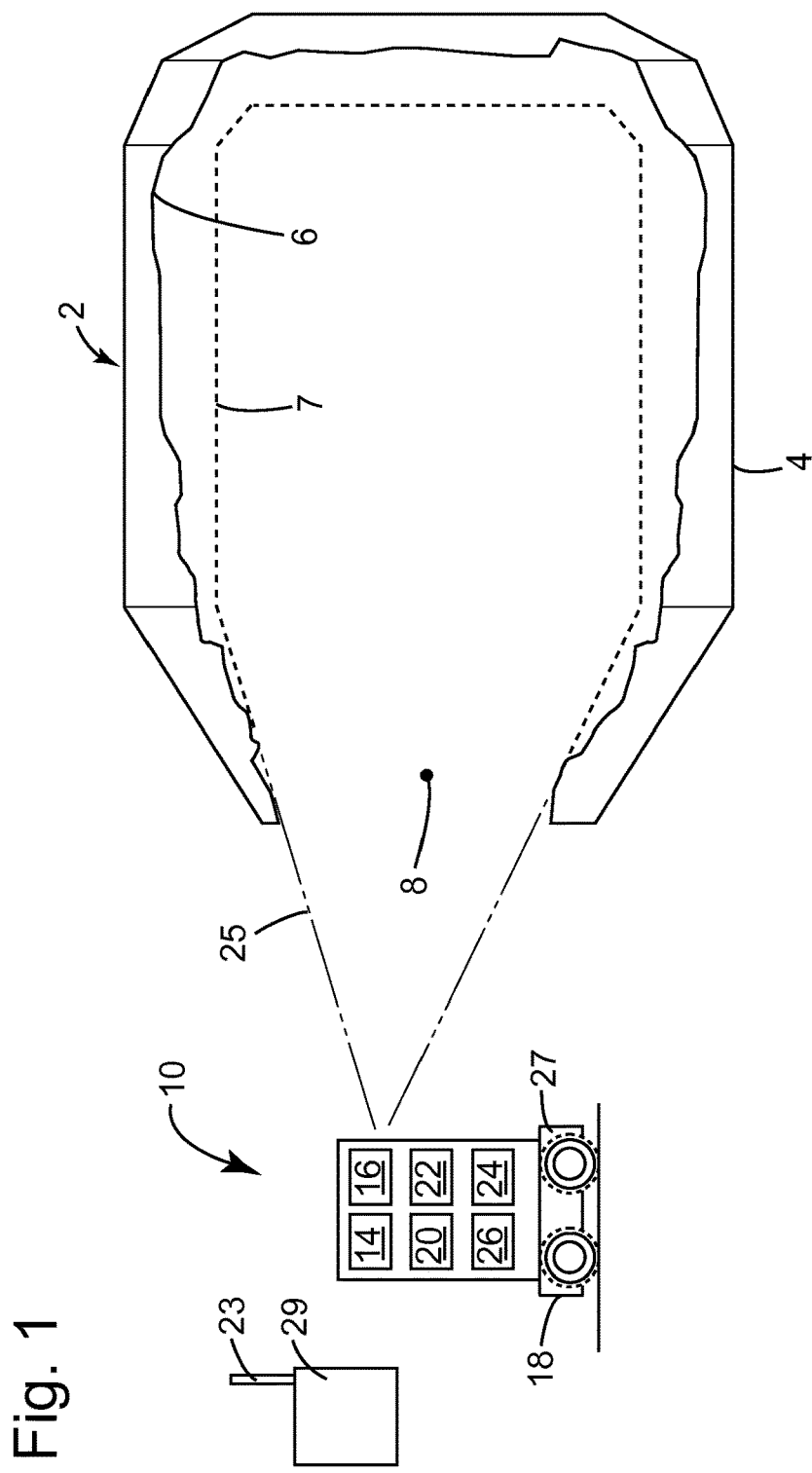
FIG. 1 illustrates a first embodiment of an autonomous scanner according to the subject matter disclosed.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of apparatuses, systems, or methods for autonomously scanning refractory lining in metallurgical containers. However, the embodiments to be discussed next are not limited to these sets, but may be applied to other apparatuses, systems, or methods, including, but not limited to, the characterization of lining materials in containers configured to carry substances at temperatures above the melting point of the material of which the container is made of. As used herein throughout, the term "characterize," as for example in the expression "characterize the refractory lining," means to analyze and/or measure the inside surface of the refractory lining, using an autonomous laser scanner, in order to determine the interior refractory lining profile and calculate remaining lining thickness in order to, for example, assess the maximum permissible lifetime while maintaining a low probability of breakthrough or determine when repairs are needed. Lining characterization may also be used to determine the position of auxiliary devices used in the metallurgical industry during processing, as for example, the proper set point for an oxygen lance height. Also, as used herein throughout, the expression "autonomous scanner," "autonomously," and the like mean a scanner that moves independently of physical assistance from a person (or operator). It means a scanner capable of being self-propelled when moving from a first position to a second position without any physical assistance or interference from a person (or operator).

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Disclosed herein are various embodiments of autonomous scanners to characterize the wear in the refractory lining of containers used in the metallurgical industry without the need for a user to be exposed to the harsh environment normally existing in these industrial operations. These autonomous scanners are configured to position themselves with respect to the container, scan the interior surface thereof, and provide to a user in a safe location, either in real time or shortly after the scan is finished, a characterization of the refractory lining so that a decision can be made if repairs are needed before putting the vessels back in production or removing the same from production for repairs. As those of ordinary skill understand, one of the steps needed in this refractory lining characterization, is the accurate positioning of the autonomous scanner with respect to the vessel—many times referred to in the industry as "registering" or "the registration process." Based on the subject matter disclosed herein it will become clear to those of ordinary skill that the autonomous scanners disclosed are capable of using any registering procedure known in the applicable arts.

It should be noted that in the field of characterizing the wear of metallurgical containers, there are existing processes for taking scanned data and applying various known processing steps in order to generate an image of the lining surface so as to identify areas in need of repair. Based on this image, which can be represented graphically in hard copy, on a screen in soft copy, in a tabular, numerical output, etc., a refractory processing expert determines whether repair to the lining of the container is needed and advises a metallurgical company accordingly. The embodiments discussed next improve this technological process of determining the worthiness of a metallurgical container by characterizing thin or weak areas in the refractory lining using autonomous scanners so as to obviate the requirement for operators of these devices to be exposed to harsh and dangerous environment in order to improve plant safety and to extend the life of the container.

FIG. 1 illustrates a general example of an autonomous scanner 10 according to an embodiment of the subject matter disclosed. As shown, the autonomous scanner 10 is configured to scan and characterize a refractory lining material 6 designed to protect a metallic shell 4 of a container 2. The dashed line 7 inside the container 4 of FIG. 1 illustrates the original layer of refractory lining 6 before the container was placed in use. The difference between lines 7 and 6 is what the autonomous scanner 10 is configured to detect in order for an operator to decide when to take the container 2 out of service for repair. In the embodiment shown, the autonomous scanner 10 includes, as illustrated, a range finder 14 and a laser scanning system 16 mounted on a robotic vehicle 18 configured to move the autonomous scanner 10 as necessary automatically or upon a command from a user connected to the autonomous scanner 10 via a wired or wireless connection, as further discussed below.

In such embodiment, the laser scanning system 16 further includes a laser, a scanner, optics, a photodetector, and receiver electronics (not shown). Such laser scanning systems are configured to fire rapid pulses of laser light at a target surface, some at up to 500,000 pulses per second. A sensor on the instrument measures the amount of time it takes for each pulse to return from the target surface to the scanner through a given field of view 25. Light moves at a constant and known speed so the laser scanning system 16 can calculate the distance between itself and the target with high accuracy. By repeating this process in quick succession and by incorporating the position of the autonomous scanner 10 relative to the container 2 being measured, the instrument builds up a complex thickness 'map' of the refractory surface it is measuring. By calculating and/or comparing changes between measured refractory thickness maps of the internal surfaces of the refractory lining 6 with a reference measurement of the same surfaces, changes are detected and evaluated for possible conditions that may result in a failure of the refractory lining/shell combination. Single measurements can be made in 20 to 30 seconds. An entire map of the furnace interior comprises of, for example, 4 to 6 measurements and more than 5,000,000 data points can be completed in a short time period (e.g., less than 10 minutes).

An integral part of the autonomous scanner 10 is the remote vehicle 18, with its associated control system, configured to move and position the autonomous scanner 10 as needed and desired. In some embodiments the remote vehicle 18 and the autonomous scanner 10 are integrally assembled into a single and same device and in other embodiments the same pieces of equipment are separate and distinct from each other. One of the advantageous features of the integral embodiment is that the various subcomponents can be better positioned for the various tasks to be performed for not only scanning the containers to be characterized, but also in moving the entire assembly from various positions during, before, or after measurements are made. In some embodiments, the remote vehicle 18 is motorized and uses either electric power or a hydrocarbon fuel as an energy source and, as further explained below, such remote vehicles may be tracked or wheeled base. In embodiments using hydrocarbon fuels, the remote vehicle 18 may also incorporate an electric generator.

In order to assist the autonomous scanner 10 with its movement and positioning, in the embodiment shown, the same is equipped with various sensors, including, but not limited to, an antenna 20, proximity sensors 22, and/or optical sensors or machine-vision devices 24. The range finder 14 may include, for example, a LIDAR (Light Detection And Ranging OR Laser Imaging, Detection and Ranging), a radar, or sonar ranging sensors. In other embodiments, the autonomous scanner 10 may also include preferably a stereovision system, a global positioning satellite receiver, an inertial navigation system (INS), and/or an odometer. Thus, in one embodiment, through use of an appropriate position measurement system such as the tracking system described below, and possibly in combination with collision avoidance technology, the autonomous scanner 10 may be configured to move from a storage position to a measurement position in front of the container 2 (a ladle, for example), scan the same, and then return to the storage position without an operator having to physically handle the autonomous scanner 10. The range finder 14 is capable of scanning the environment surrounding the autonomous scanner 10 and to detect reflective surfaces of objects such as walls and any other possible obstacles in its surroundings. Data from the range finder 14 may be used to generate and maintain a map of the autonomous scanner 10 along its path of travel as well as for other purposes such as for example, but not limited to, obstacle avoidance and navigational purposes. Thus, in another embodiment, optical sensors and machine-vision devices 24 are not used and obstacle detection and collision avoidance is accomplished by the laser scanning system 16.

In one embodiment the laser scanning system comprises an Anteris laser scanner, having a small (about 4 mm) beam diameter, high accuracy (about ±6 mm range error peak-peak) high scanning rates (up to 500,000 Hz), a robust design suitable for the mill environment and the heat loads imposed while scanning high temperature surfaces, eye safe laser wavelength (which eliminates and/or substantially reduces workplace safety concerns), ±55° vertical scan angle, and 0-360° horizontal scan angle. Such laser scanners allow standard resolution scans of a vessel interior in about six to seven seconds, resulting in less vessel down time, and higher production availability. In high resolution mode, the Anteris scanner can provide detailed images of the vessel that can be used to characterize the refractory lining, define the region around a tap hole, or the condition of a purge plug.

Figure 2:
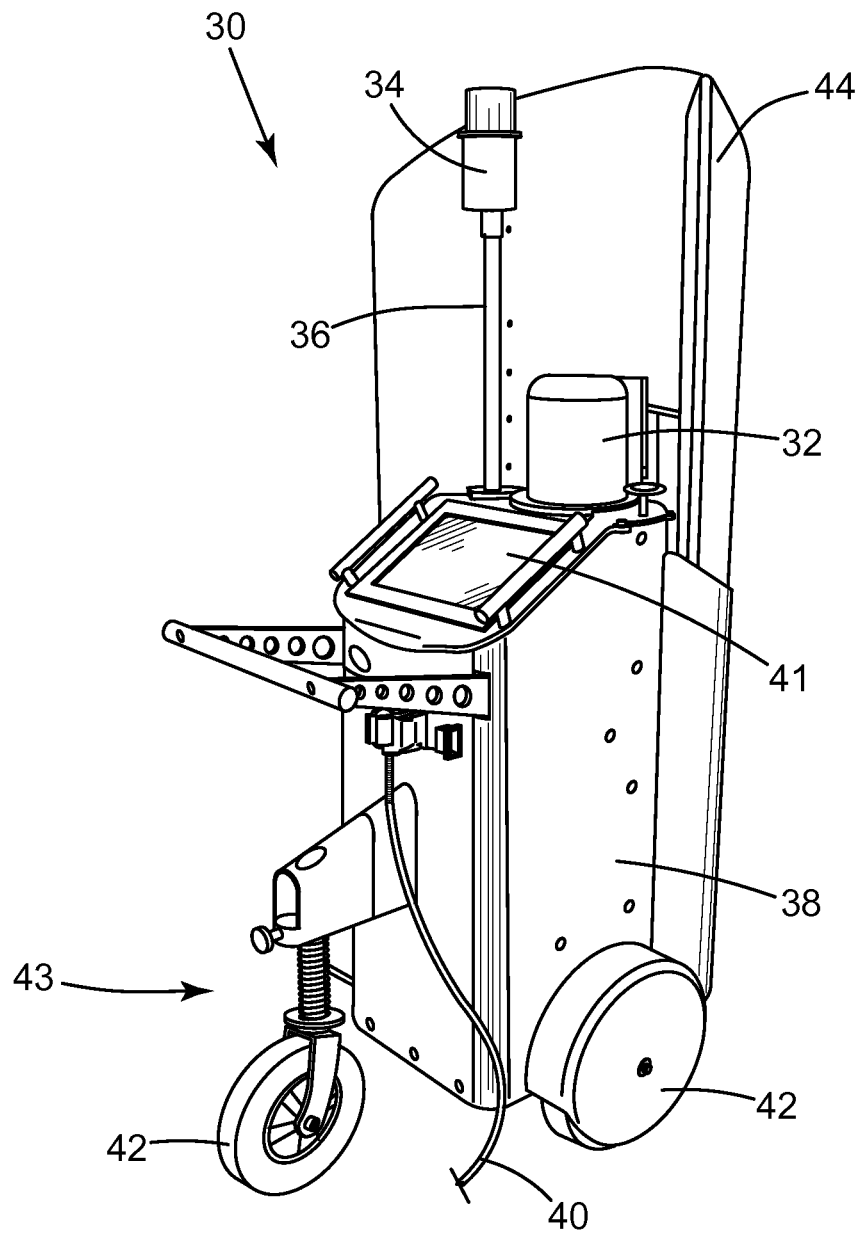
FIG. 2 illustrates a close-up view of a second embodiment of an autonomous scanner according to the subject matter disclosed.

In another embodiment, an autonomous scanner 30, as further illustrated in FIG. 2, contains all the main components in a self-containing unit. The autonomous scanner 30 includes a laser-based contouring scanner 32, a laser tracking system 34 mounted on a pole 36, computer hardware and software 38 for system control and data reduction (in at least some embodiments), cabling 40, a liquid-crystal flat panel touchscreen display 41, keyboard and mouse function (not shown in FIG. 2), and large-diameter wheels 42 to reduce rolling resistance, a heat shield 44, and several other components not illustrated in FIG. 2, including a high-speed Ethernet link, and on-board battery power. The autonomous scanner 30 further comprises a fully integrated robotic vehicle 43. For many applications, remote operation is possible by placing the computer in a location separate from the mobile system location, for example, a control room in the plant where the high-temperature vessel is located, or other suitable structure away from the vessel. Furthermore, the autonomous scanner 30 requires no external cables or cooling lines and is fully suspended on the wheels 42 in order to reduce shock and vibration to system components. In one embodiment the robotic vehicle is self-leveling; in another embodiment it contains integrated inclination measurements to determine tilt, such as inclinometers, in order to minimize and/or eliminate the need for a complex mechanical system.

Harvill and Bonin (U.S. Pat. No. 6,922,252, incorporated herein by reference in its entirety and hereinafter the '252 patent) have disclosed a tracking system to make automatic position measurement (registration) using a rotating laser beacon and reflectors placed on or near the plant floor at known positions relative to the vessel. Using laser triangulation, this system is able to determine the position of a scanning system relative to the vessel. Once the position is known, the position information is typically transferred automatically to the scanning system software for calculation of the lining profile and thickness.

While the tracking system 34 is in operation, a beam of optical radiation is emitted and reflected from at least three reference reflectors in the tracking system's environment. The tracking system 34 may also be configured to sense the optical radiation reflected from each of the reflectors and to measure and record the angle at which each individual reflection takes place. The position of the reflectors is known relative to the container's frame of reference and may be determined by common surveying methods or from the blueprints of the container and floor plan of the industrial site. Using triangulation, the recorded angles are used to calculate the position and heading of the tracking system. Once the position and orientation of the tracking system are determined, a mathematical transformation can be performed on the position and orientation information to determine the location and heading of the autonomous scanner 30. It is understood that such capability will eliminate the need to use fixing points mounted at or near the high-temperature container and will also eliminate the need for user interference while measurements are being made. In the solution procedure for the tracking system, one may solve for the position of the tracking system in a given frame of reference from knowledge of the vector position of each reflector in the same frame of reference. Contrarily, one may also solve the vector position of each reflector based on knowledge or measurements of the position of the tracking system.

In one embodiment, the operation of the laser tracking system 34 is automated. In some applications, such as, for example, a converter, the autonomous and automated features of the subject matter disclosed coupled with the high-speed data acquisition capabilities provide several advantages not found in prior-art solutions, i.e., fully-automated measurement capability, documentation of furnace profile over the entire interior of the converter (this is a serious limitation of fixed-position systems; their ability to measure lining thickness over the entire converter interior is hampered by the available field of view) heat-to-heat assessment of refractory wear, detection of sudden variations in wear patterns (with direct relation to changes in process, prediction, and scheduling of maintenance in advance of the immediate need for repairs), and heat-to-heat lance height control, all without exposing the user of the system to a harsh and/or dangerous environment.

Typical range measurement systems use a scanned beam to quickly record multiple positions and ranges. When the range data are acquired, they are referenced to the position of the range measurement device. The desired contouring or thickness information, e.g., the shape of the internal layer of refractory lining 6 shown in FIG. 1, however, is relative to the container 2 or the known original layer of refractory lining 7 (hereinafter referred to as the "reference shape"). Therefore, the range data measured in the frame of reference of the range finder need to be converted into a frame of reference relative to the reference shape, taking into account the position of autonomous scanner 30 measured with the laser tracking system 34 with reference to its own coordinate system or frame of reference. The converted data can then be presented in a meaningful fashion to the user, or incorporated directly into the contouring measurement as needed for the conversion of range data to contour and/or thickness information.

Various embodiments of suitable laser scanning systems are contemplated in the scope of the subject matter disclosed. In one embodiment, a three-sided scanning mirror and a pulsed laser range finder integrated in a single, stand-alone package is used. The mirror deflects the laser in one axis, and the mirror and range finder are rotated together in the second axis to capture the full field of view. In another embodiment the laser scanning system includes an integral cooling system, so as to allow the autonomous scanner 30 to position itself as close as possible (e.g., within a range of about 2 to about 3 m from high-temperature (1700° C.) surfaces), thereby allowing refractory thickness measurements in high-temperature environments that have limited optical access such as a gasifier. A second embodiment of a suitable scanning system is an accurate, full image capture system based on pulse range finding. This system may also be integrated with the range finder and includes cooling capabilities. A third embodiment of a suitable scanning system is also an integrated, full image capture scanning system based on CW range finding for general industrial applications and a specialized profiling system composed of three scanners. Yet a fourth embodiment of a suitable scanning system is a single-axis line scanning system.

As it will be appreciated by those of ordinary skill in the applicable arts, other methods for registering the position of the autonomous scanners disclosed herein with the respect to the container are within the scope of the subject matter disclosed. For example, in one embodiment, targets placed on the bottom of the vessel maybe used. And, while the vessel is rotated so as to expose its bottom to the mobile system, a visible laser is directed towards the center of each target, and the bearing and elevation measured of at least three targets. From this information, the position of the autonomous scanner can be determined, as further explained in U.S. Pat. Nos. 5,570,185 and 5,546,176, the contents of which are incorporated herein by reference in their entirety. In another embodiment, the use of image analysis to determine the relative position of the mobile system and the metallurgical vessel is employed. See, for example, U.S. Pat. No. 6,922,251 (hereinafter the '251 patent), the contents of which are incorporated herein by reference in their entirety. In operation of such an embodiment, a scan is made of the vessel, and a specific geometric element identified (for example, the edge of a rectangular plate or a line of bolts). This feature, defined in the '251 patent as an operator, can then be used to determine position when properly scaled. Finally, in another embodiment, registering is accomplished by the use of temporary marks places in front of the furnace, as further described in U.S. Pat. No. 7,924,438 (hereinafter the '438 patent), the contents of which are incorporated herein by reference in their entirety. These marks are then scanned during measurement of the furnace interior. Since the position of the marks is known relative to the furnace, their position in the scan can be used to determine the relative position of the mobile system and the furnace, thus completing the registration process.

Another advantageous feature of the subject matter herein disclosed is the use of protection for the autonomous scanners against high temperatures, thereby minimizing and/or eliminating the effct of heat load on the scanners. The heat load on the autonomous scanner may be estimated by the following relationship:

$$q = \varepsilon \sigma T^4, \tag{1}$$

where $\varepsilon$ is the surface emissivity, $\sigma$ is the Boltzman constant, and T the surface temperature of the converter. Taking the surface emissivity of the converter at 0.6 (a nominal number for refractory/slags) and the surface temperature at 1700° C. and substituting these values into Equation (1) yields:

$$q = (0.6)(5.67\,e^{-8})1973^4 = 443{,}000 \ \frac{W}{m^2}. \qquad (2)$$

In order to determine the amount of energy absorbed by the autonomous scanner, the surface absorptivity of the device and its frontal area are needed. Assuming that the scanner is constructed of polished stainless steel having a nominal absorptivity of 0.1 and a frontal area of 1.4 m², the energy absorbed by the cooling jacket is given by:

$$Q = A\alpha q, \qquad (3)$$

where A is the frontal area, a is the absorptivity, and q the radiant energy incident on the cooling jacket. Note that it has been assumed, in a worst-case analysis, an infinite radiant source and relative view factors between the cooling jacket and the converter have not been accounted for.

Substituting these values in Equation (3), an estimate of the total heat load to the scanner would be:

$$Q = (1.4)(0.1)(443{,}000) = 62{,}197\,W \qquad (4)$$

Given the high potential heat load that one might expect in some industrial applications, an appropriately designed radiation shield would be a desirable feature for the autonomous scanners disclosed. Depending on ambient condition, radiation shielding may be augmented with active air or liquid-phase cooling. Water or phase-change salts are capable of providing excellent thermal capacitance, particularly given the short measurement times that result during fully automated operation.

In one embodiment, the laser tracking system 34 can be used to provide position feedback to the robotic vehicle 43. In another embodiment, the user would move the autonomous scanner out of its storage location using a telecommand (for example, a joystick controller). Once the autonomous scanner is in range of the tracking system reflectors (the tracking system laser scanner could be on during this period, and signal the user when it has locked position), further movement could be executed by automatic control using the computer mounted on the autonomous scanner 30.

The autonomous scanner would then move to the first measurement position, and wait for the user to move the furnace to the proper furnace tilt. Driving would be under software control, receiving position feedback from the tracking system and collision avoidance from the laser scanner or other collision avoidance devices as described above. A fully automated solution may include wireless control of the converter tilt from the autonomous scanner computer. Since a wireless inclinometer is usually provided on the furnace that communicates furnace tilt to the autonomous scanner computer, the computer knows when the converter is at the proper position, and can subsequently initiate a measurement.

In fully automatic mode, the autonomous scanner would move the scanner to the proper position in front of the converter and control furnace tilt. If automated control of furnace tilt were not possible, then the autonomous scanner would signal the operator for the correct furnace tilt. This operator feedback could be provided via a series of lights, a video screen, a handheld tablet, to name just a few examples known in the applicable arts.

The charge floor in front of the converter on which the autonomous scanner will operate when scanning the converter is shared by a number of different pieces of equipment. These can include digging machines that deskull the furnace mouth, scrap chargers, gunning machines, etc. Thus, in some embodiments, the field in front of the autonomous scanner (where the autonomous scanner intends to move) should be cleared and confirmed. For this purpose, one could either use various collision avoidance techniques such as stereo vision, video, sonar, or preferably, use the laser scanner itself to confirm that objects in the field of view are further away than the intended movement of the autonomous scanner.

The laser scanning system 16 and its general controller may be disposed together in the same device or be separate from one another. For example, a mobile system embodiment may include both in the same unit. In another embodiment, the laser scanner system 16 may be a unit by itself configured to be positioned in front of the container to be characterized and its general controller be positioned in another location (for example, in the plant's operation control room). As used here, the general controller may also be referred to as a data reduction device and/or a computing or computer device.

Figure 3:
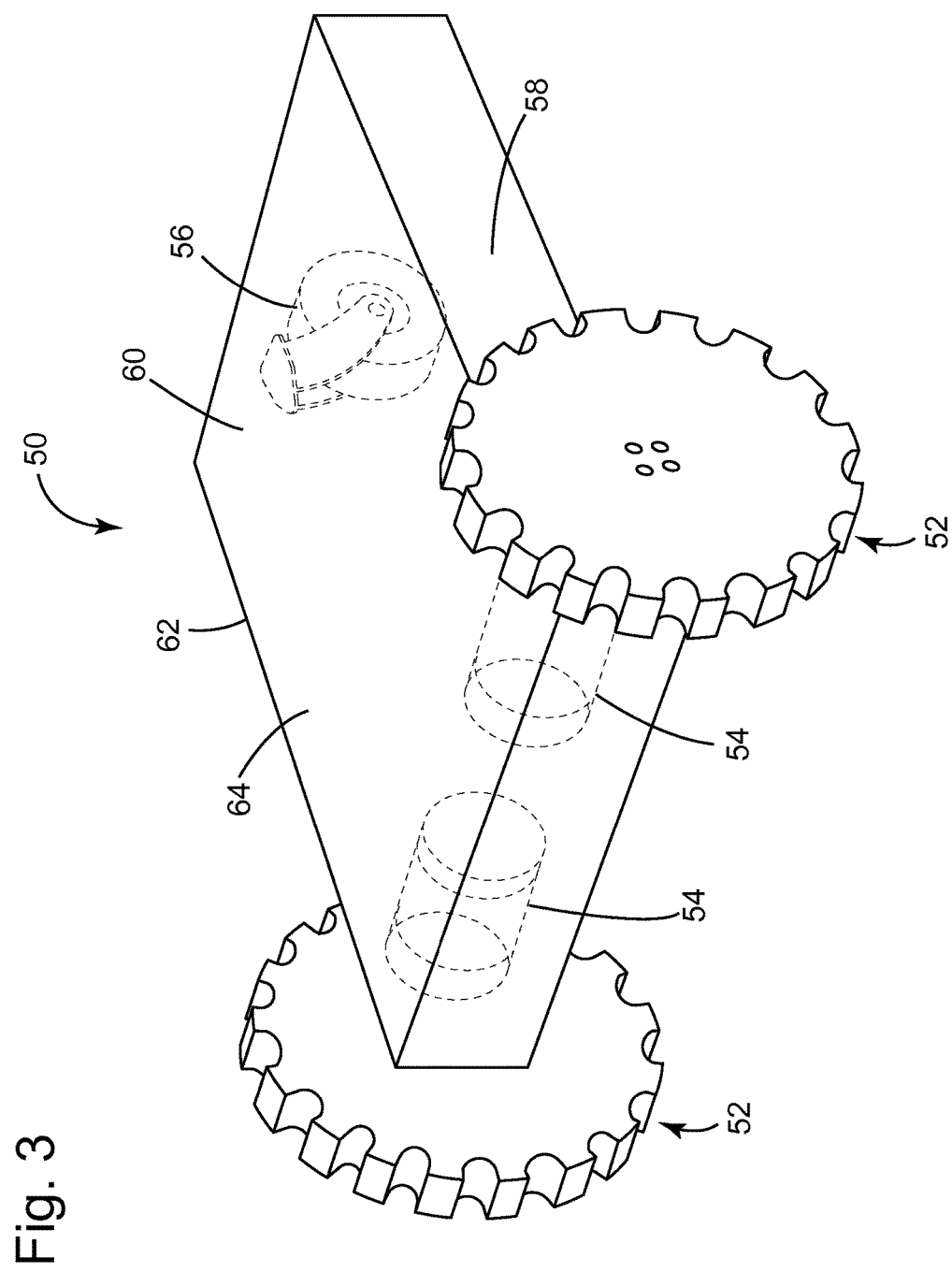
FIG. 3 illustrates a first embodiment of a robotic vehicle of the autonomous scanner of FIG. 1.
Figure 4:
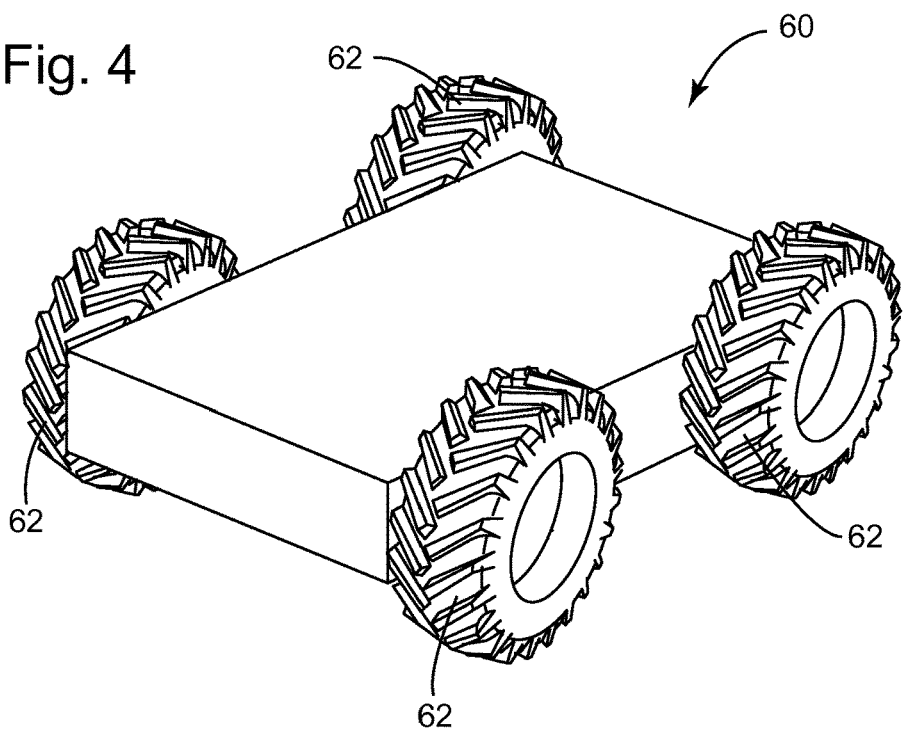
FIG. 4 illustrates a second embodiment of a robotic vehicle of the autonomous scanner of FIG. 1.
Figure 5:
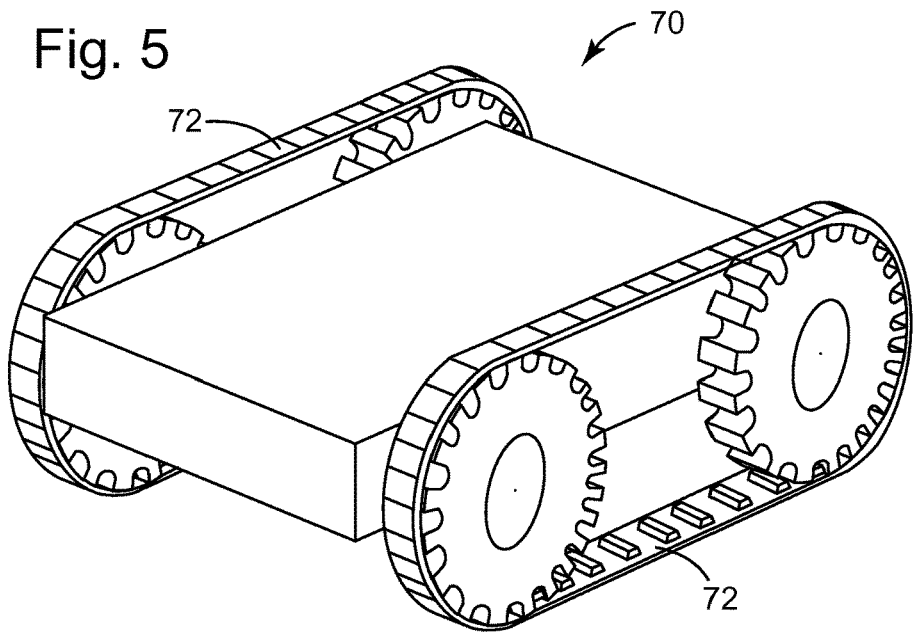
FIG. 5 illustrates a third embodiment of a robotic vehicle of the autonomous scanner of FIG. 1.

FIGS. 3-5 illustrate three different embodiments of a robotic vehicle according to the subject matter disclosed herein. In FIG. 3, the robotic vehicle 50 includes two custom metal wheels 52, separate motors 54, and a caster 56 disposed on a steel frame 58 covered by aluminum plates 60. Inside the steel frame 58, a controller 62 and sealed-lead-acide (SLA) batteries 64 are disposed. As appreciated by those of ordinary skill in the applicable arts, the floor in front of and surrounding these metallurgical containers are rarely smooth, being more often littered with detritus from the hood, metal scrap from scrap charging, pieces of molten metal that have solidified and that may still be at elevated temperature. Therefore, the selection of the wheels 52 should take this fact into consideration. One of their advantageous features is that they are sufficiently large to allow the autonomous scanner to navigate rough terrain, and have high temperature tolerance to avoid catching fire should the autonomous scanner roll over a piece of debris that is still hot. In another embodiment, the robotic vehicle 60 shown in FIG. 4 comprises four wheels 62. In yet another embodiment, the robotic vehicle 70 comprises two sets of tracks 72 to propel the robotic vehicle as needed. Those of ordinary skill will appreciate that other forms of robotic vehicles are within the scope of the subject matter disclosed, including those that will include combinations of the features shown in FIGS. 3-5. Also, in view of the working conditions around such containers in industry, as already noted above, metal wheel and/or metal tracks would be preferable in some of the embodiments disclosed.

In one embodiment, the robotic vehicle 18 includes a control unit or processor 27 (FIG. 1) for executing control software, processing sensor input and commands from an operator, and controlling the components and subsystems of the robotic vehicle 18. In accordance with an embodiment, the control software includes sets of computer software corresponding to various robotic vehicle behaviors and routines, and also includes operation routines that control various displacements or operations in response to commands received from the operator. For example, the control software may include routines for moving the autonomous scanner 10 from a storage facility to a pre-selected position for scanner measurements, avoiding obstacles during the translation from storage to measurement position, or following a path specified by the operator via an operator control unit (OCU). Various concurrent routines may additionally be running, such as stability issue detection and correction that function automatically during operation of the robotic vehicle 18.

When operating without user physical interference, the autonomous scanner 10 in one embodiment may generate and update a map of its position and to display the same to the operator. Once generated, the map can be transmitted to a telecommand console 29 (FIG. 1) over any form of wired or wireless digital communication between the mobile robot 10 and the telecommand console 29. In one embodiment, the telecommand console 29 may include a computer system having a display for presenting the positional map to the operator, as well as input systems such as a keyboard, a mouse and a joystick. The positional map may be transmitted wirelessly from the antenna 20 of the autonomous scanner 10 via an antenna 23 of the telecommand console 29. Alternatively, the autonomous scanner 10 may store the positional map on a detachable memory storage device 26 (which may be a USB memory stick, a Flash RAM or SD/MMC memory chip, or the like) that the operator can retrieve when the autonomous scanner completes an autonomous operation and access using the telecommand console 29 or other suitable device.

One of ordinary skill will understand based on the subject matter disclosed herein that there are several modes of utilization of these autonomous scanners, these being generally classified in semi-automated and fully automated deployments. In a semi-automated deployment mode of utilization, the system is moved from position-to-position by an operator using, for example, a remote-control joystick or any other form of a telecommand. Wireless communication between the mobile laser computer and a hand held Human Machine Interface (HMI) device allows control of the laser measurement itself. The HMI could, for example, be a hand held computer, tablet, or smart phone. An integrated, portable panel that holds both the controls for movement and the controls for laser operation is envisioned. Such a configuration will allow the system to be controlled from the furnace tilt controls—the operator being both out of the heat load and away from the falling debris zone. Measurement time is reduced because the operator can tilt the furnace and move the mobile system from location to location from the same position.

In another semi-automated deployment embodiment, the user places the system at the furnace centerline (the first position for measurement, as described above). The furnace is tilted by an operator to the appropriate angle for the first measurement. The operator then initiates the start of laser data acquisition. The laser scans the vessel, and then signals the operator (through the wireless HMI) to tilt the converter to the next tilt position. A vessel tilt prompt could be placed on the HMI. Since the autonomous laser system is constantly measuring the furnace tilt, as soon as the expected furnace tilt is achieved and the tilt measurement is stable, the system will make the second measurement. When the second measurement is complete, the system will automatically move to a pre-programmed position to the right of the furnace centerline. The tracking system described above in conjunction with the robotic vehicle is used to guide the autonomous scanner to the proper position and heading. Once in position, the system automatically scans the vessel. Following the scan, the system again automatically moves to a pre-programmed position to the left of the furnace centerline and the final scan of the vessel is completed. When done, the system signals the operator to change the vessel tilt to the upright position, and the system is returned to its storage position by the operator.

In another embodiment, the software controlling the data acquisition includes a completion grid. This is a color-coded polar plot mapped to the container interior whose segments are colorized as data are obtained from corresponding regions in the furnace. In some cases, the furnace mouth skull is sufficient so as to require the system be placed further away from the furnace centerlines during measurement. If the operator suspects interference from the mouth skull, the software could be programmed to query the user to confirm that the completion grid is sufficiently filled with color indicating data have been collected at pertinent regions in the furnace. If the status of the completion grid is unacceptable, the system could be pre-programmed to have the robotic vehicle to move the autonomous scanner a certain transverse distance further away from the furnace centerline and repeat the scan. Alternately, since the coordinates of the completion grid are roughly mapped to the vessel interior, it is possible to calculate the amount of lateral movement that is required to bring the remaining areas in the converter into the lasers field of view. Such a calculation could be made, and then suggested by the system to the operator to confirm an additional measurement be made at the new position.

In fully automated deployment embodiments, fully automated measurement of the refractory lining is possible taking advantage of the possibility that many molten metal processing plants have the furnace tilt under computer control. The process is similar to that of the semi-automated approach and the operator may still choose to place the unit at a first measurement position. Alternately, the system may be designed and programmed to find its own, pre-programmed measurement position, for embodiments provided with collision-avoidance technology. However, commands for tilting the furnace, initiating measurement, and moving the mobile system laterally to the left and right of the furnace centerline would all originate and be sequenced from the plant PLC (or Programmable Logic Controller) or computer, communicating with the autonomous scanner 10 over a wireless network link.

Both semi- and fully-automated embodiments could be pre-programmed with specific measurement sequences. For example, a single measurement made when the scanner is aligned with the furnace centerline is often desirable for determining lance height. A second sequence might only include measurement made on the furnace centerline, but at two furnace tilts to expose the tap and charge pads of the furnace. A third sequence includes the full furnace characterization described above.

Finally, those of ordinary skill will also appreciate that measurement of ladles using the autonomous scanner 10 is also within the scope of the subject matter disclosed. This is particularly true if the ladle is measured at the slide gate maintenance station. Through use of the tracking system and possibly collision avoidance technology, an autonomous scanner could move from its storage position to the measurement position in front of the ladle, scan the ladle, and then return to its storage position without operator intervention.

Figure 6:
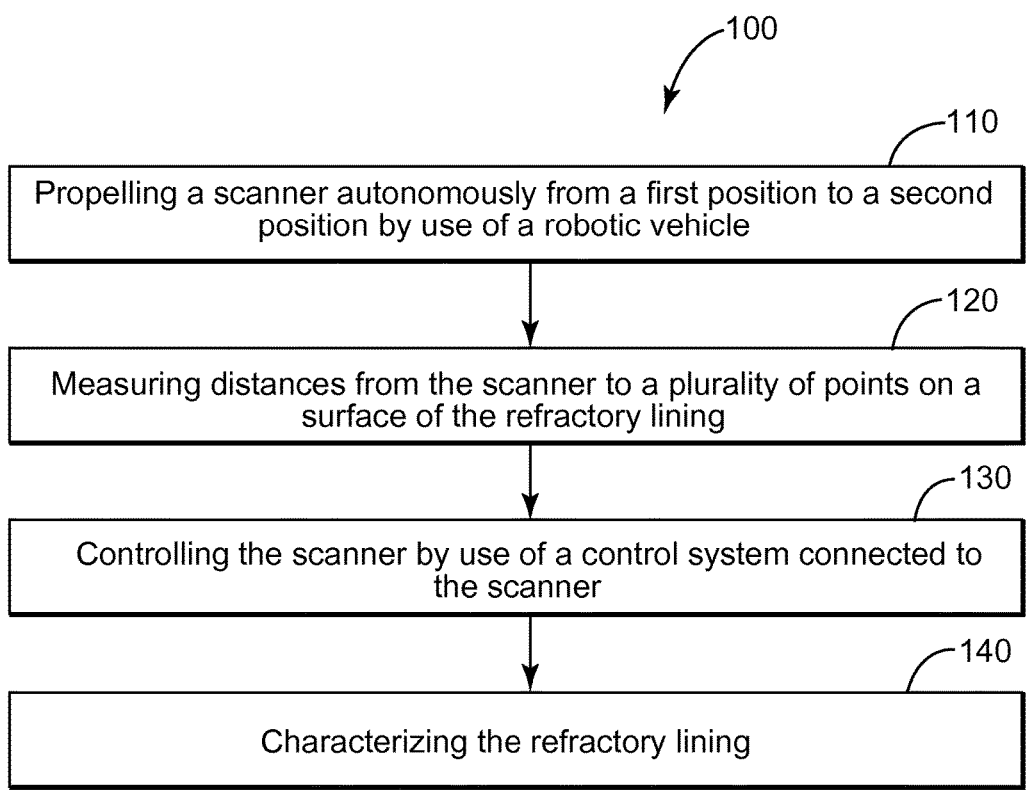
FIG. 6 illustrates a flowchart of a method for autonomously characterizing the refractory lining in a metallurgical container according to the subject matter disclosed.

Methods and processes configured to autonomously characterize the refractory lining of a metallurgical container are also within the scope of the subject matter disclosed. FIG. 6 illustrates the flowchart of an exemplary embodiment of a method or process 100 according to the subject matter disclosed. As shown, at 110, such methods include propelling a laser scanning system autonomously from a first position to a second position by use of a robotic vehicle having a controller and a drive system. At 120, measuring with the laser scanning system distances from the laser scanning system to a plurality of points on a surface of the refractory lining. At 130, controlling the scanner by use of a control system comprising hardware and software, said control system being communicatively connected to said laser scanning system, said controller, and said drive system. And, at 140, characterizing the refractory lining by comparing the plurality of distances measured by the laser scanning system to a reference surface of the refractory lining.

Figure 7:
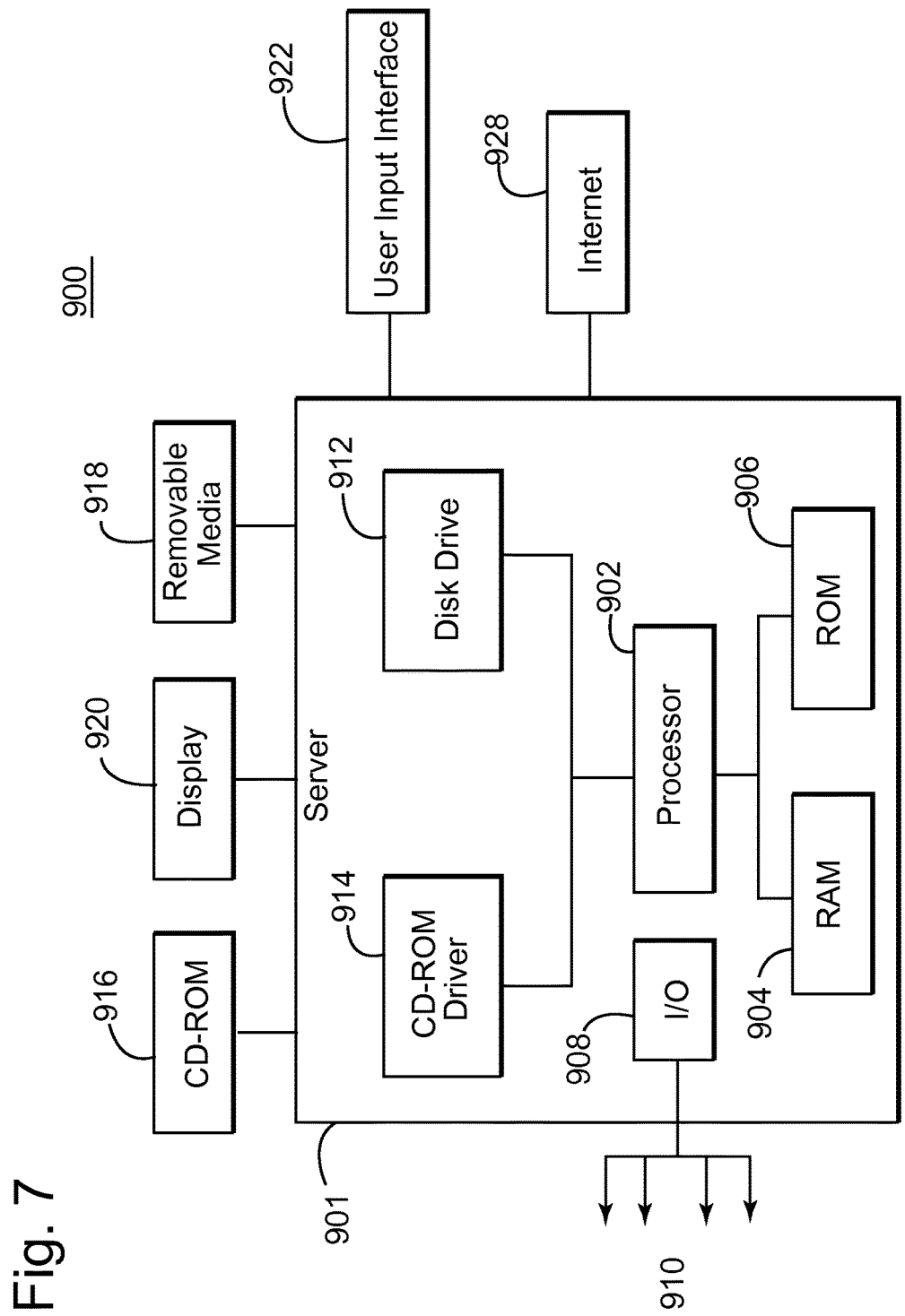
FIG. 7 illustrates a computer system configured to autonomously characterize the refractory lining in a metallurgical container according to the subject matter disclosed.

One or more of the steps of the methods comprising the subject matter disclosed may be implemented in a computing system specifically configured to autonomously characterize the refractory lining of a metallurgical container as explained hereinabove. An example of a representative computing system capable of carrying out operations in accordance with the exemplary embodiments is illustrated in FIG. 7. Hardware, firmware, software or a combination thereof may be used to perform the various steps and operations described herein.

The exemplary computing system 900 suitable for performing the activities described in the exemplary embodiments may include a server 901. Such a server 901 may include a central processor (CPU) 902 coupled to a random access memory (RAM) 904 and to a read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910 to provide control signals and the like. The processor 902 carries out a variety of functions as is known in the art, as dictated by software and/or firmware instructions.

The server 901 may also include one or more data storage devices, including a disk drive 912, CD-ROM drives 914, and other hardware capable of reading and/or storing information such as DVD, etc. In one embodiment, software for carrying out the above-discussed steps may be stored and distributed on a CD-ROM 916, removable memory device 918 or other form of media capable of portably storing information. These storage media may be inserted into, and read by, devices such as the CD-ROM drive 914, the disk drive 912, etc. The server 901 may be coupled to a display 920, which may be any type of known display or presentation screen, such as LCD displays, LED displays, plasma display, cathode ray tubes (CRT), etc. A user input interface 922 is provided, including one or more user interface mechanisms such as a mouse, keyboard, microphone, touch pad, touch screen, voice-recognition system, etc.

The server 901 may be coupled to other computing devices, such as the landline and/or wireless terminals via a network. The server may be part of a larger network configuration as in a global area network (GAN) such as the Internet 928, which allows ultimate connection to the various landline and/or mobile client devices.

The disclosed exemplary embodiments provide apparatuses, methods, and systems for autonomously characterizing the refractory lining of a metallurgical container as well the other uses hereinabove summarized and appreciated by those of ordinary skill in the applicable arts. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments might be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. A scanner for characterizing a refractory lining in a container, the scanner comprising:
   a frame;
   a laser scanning system mounted on the frame, said laser scanning system having a laser, a scanner, optics, a photodetector, and receiver electronics, said laser scanning system being configured to measure, in measurement position, distances from the laser scanning system to a plurality of points on a surface of the refractory lining;
   a robotic vehicle attached to the frame, said robotic vehicle having drive system comprising wheels or tracks and a controller configured to operate the drive system and control motion of said robotic vehicle, said robotic vehicle being configured for motion on a floor to propel the scanner autonomously in an area adjacent to the container from a first position to a second position along the floor, and said robotic vehicle not comprising gunning equipment;
   a tracking system, in communicative connection with the controller, configured to determine the position and orientation of the scanning system relative to the alignment of the container, to provide range data measured in the frame of reference of the tracking system and converted to a frame of reference relative to the container, and to provide position feedback to the drive system of the robotic vehicle; and
   a control system comprising hardware and software to control the scanner, said control system being communicatively connected to said laser scanning system, said controller, and said drive system, wherein the refractory lining is characterized by comparing the plurality of distances measured by the laser scanning system to a reference surface of the refractory lining.

2. The scanner according to claim 1, wherein a first measurement with the laser scanner system is performed with the scanner located at the second position and the scanner is positioned at the first position by a user.

3. The scanner according to claim 1, wherein a first measurement with the laser scanner is performed with the scanner located at the first position and the container is moved before a second measurement with the laser scanner is performed.

4. The scanner according to claim 3, wherein the container is moved by a command from the control system.

5. The scanner according to claim 1, further comprising:
a range finder mounted on the frame and communicatively connected to said control system, said range finder being configured to measure distances between the scanner and one or more objects in a surrounding of the scanner.

6. The scanner according to claim 1, wherein the control system is located in a location separate from the location of the scanner.

7. The scanner according to claim 1, the robotic vehicle further comprising:
an electrical source to provide power to the drive system.

8. The scanner according to claim 1, further comprising:
a hydrocarbon source of energy disposed on the frame; and
an electrical generator powered by the hydrocarbon source of energy, the electrical generator being configured to provide power to the drive system.

9. The scanner according to claim 5, where said range finder is configured to measure a position of the autonomous scanner relative to a position of the container using a rotating laser beacon and each positional angle between the rotating laser beacon and at least three reflectors placed in the surrounding.

10. The scanner according to claim 9, wherein the characterization of the refractory lining is accomplished by converting the plurality of distances from a frame of reference of the range finder to a frame of reference of the container, said conversion being based at least in part on a position of the scanner relative to a position of the container.

11. The scanner according to claim 5, wherein said range finder is configured to measure a position of the scanner relative to a position of the container using targets placed on a bottom of the container.

12. The scanner according to claim 5, wherein said control system is configured to avoid obstacles in a path of the scanner using range measurements made by the range finder.

13. A method for characterizing a refractory lining in a container, the method comprising:
propelling a laser scanning system mounted on a frame autonomously in an area adjacent to the container from a first position to a second position along a floor by the use of a robotic vehicle attached to the frame, said robotic vehicle having a drive system comprising wheels or tracks configured for motion on the floor and a controller configured to operate the drive system and control motion of said robotic vehicle; and said robotic vehicle not comprising gunning equipment;
tracking the position of the laser scanning system with a tracking system configured to determine the position and orientation of the scanning system relative to the alignment of the container, to obtain range data measured in the frame of reference of the tracking system and converted to a frame of reference relative to the container, and to provide position feedback to the drive system of the robotic vehicle;
measuring, with the laser scanning system in measurement position, distances from the laser scanning system to a plurality of points on a surface of the refractory lining, said laser scanning system having a laser, a scanner, optics, a photodetector, and receiver electronics;
controlling the scanner by use of a control system comprising hardware and software, said control system being communicatively connected to said laser scanning system, said controller, and said drive system; and
characterizing the refractory lining by comparing the plurality of distances measured by the laser scanning system to a reference surface of the refractory lining.

14. The method according to claim 13, wherein the measuring with the laser scanner system is performed with the scanner located at the second position and the scanner is positioned at the first position by a user.

15. The method according to claim 13, wherein the measuring with the laser scanner is performed with the scanner located at the first position, the method further comprising:
moving the container before a second measurement with the laser scanner is performed.

16. The method according to claim 13, further comprising:
measuring distances between the laser scanning system and one or more objects in a surrounding of the laser scanner system by use of a range finder mounted on the frame.

17. The method according to claim 13, wherein the controlling takes place from a location separate from a location of the scanner.

18. The method according to claim 16, wherein said range finder is configured to measure a position of the autonomous scanner relative to a position of the container using a rotating laser beacon and each positional angle between the rotating laser beacon and at least three reflectors placed in the surrounding.

19. The method according to claim 18, wherein a characterization of the refractory lining is accomplished by converting the plurality of distances from a frame of reference of the range finder to a frame of reference of the container, said conversion being based at least in part on a position of the scanner relative to a position of the container.

20. The method according to claim 16, wherein said control system is configured to avoid obstacles in a path of the scanner using range instruments made by the range finder.

* * * * *